Oct. 21, 1941.  V. B. LOWDER  2,259,824
AUTOMATIC CLUTCH RELEASE
Filed March 13, 1940  4 Sheets-Sheet 1

Patented Oct. 21, 1941

2,259,824

UNITED STATES PATENT OFFICE 2,259,824

AUTOMATIC CLUTCH RELEASE

Vander B. Lowder, Concord, N. C.

Application March 13, 1940, Serial No. 323,838

22 Claims. (Cl. 192—56)

This application is a continuation in part of my co-pending application Serial No. 225,191, filed August 16, 1938, as to all matter common to the two applications. The subject matter of these related applications, and common to both, involves improvements in an automatic clutch release adapted to disengage a driving from a driven member upon the rotation of the latter member being retarded or upon an overload being placed upon the driven member.

Therefore, it is an object of my invention to provide an improved automatic release clutch compact in construction and having the minimum replaceable parts. It has been my object to provide means whereby the operative mechanism of the said clutch may be kept continuously bathed in oil and provide a compact housing adapted to protect the operative members of the said clutch from the accumulation of lint and other foreign matter and adapted to serve as a convenient means for resetting the released coupling to the operative position.

Another object of my invention is to provide improved means, operable upon the driving and driven member becoming disengaged for the retention of the same in the inoperative position until manually reset and further providing means for the sounding of an alarm or the breaking of the circuit of the driving motor upon the disengagement of the driving member from the driven member, thereby promptly notifying the operator of trouble rather than depending upon him to discover the difficulty.

It is a further object of my invention to provide an improved means of coupling the driving member to the driven member, so that wear which normally may occur, between the coupling members, will be automatically taken up, thus assuring a positive driving connection without loose play between the coupling members.

It has also been my object to provide a mechanism readily adaptable wherever an over load release clutch may be desired.

Other objects and advantages of this invention are set forth in the following description, taken with the accompanying drawings; and the novel features thereof are pointed out in the appended claims. The disclosure, however, is illustrative only and I may make changes in detail, especially in matters of shape, size and arrangement of parts within the principle of the invention, to the full extent indicated by the broad and general meanings of the terms in which the appended claims are expressed.

Figure 1:
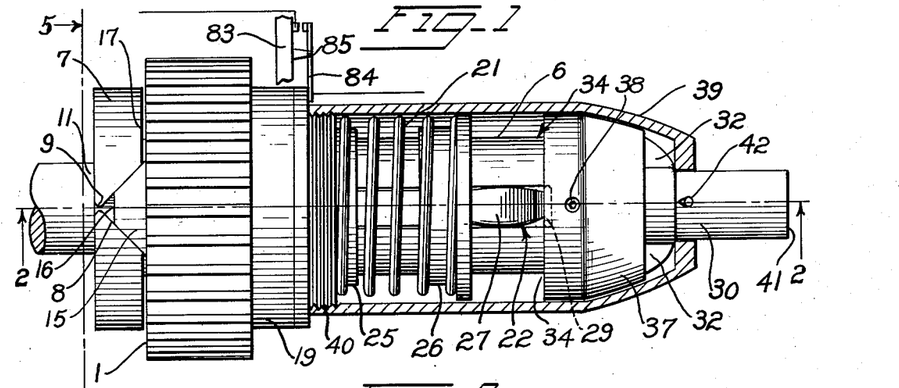
Figure 1 is a side elevation of my improved automatic release clutch with the housing for convenience broken away showing the release mechanism.
Figure 2:
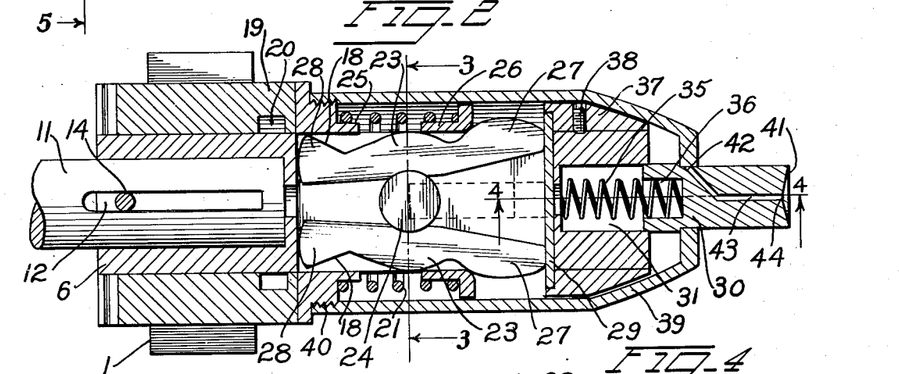
Figure 2 is a longitudinal section taken along the line 2—2 of Figure 1.
Figures 3, 4:
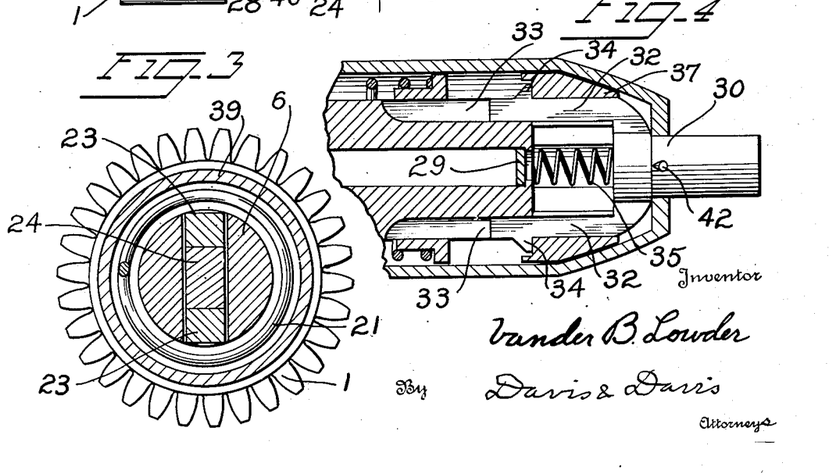
Figure 3 is a cross section taken on line 3—3 of Figure 2.
Figure 4 is a longitudinal section of the reset plunger taken along the line 4—4 of Figure 2.
Figures 5, 6, 7, 8:
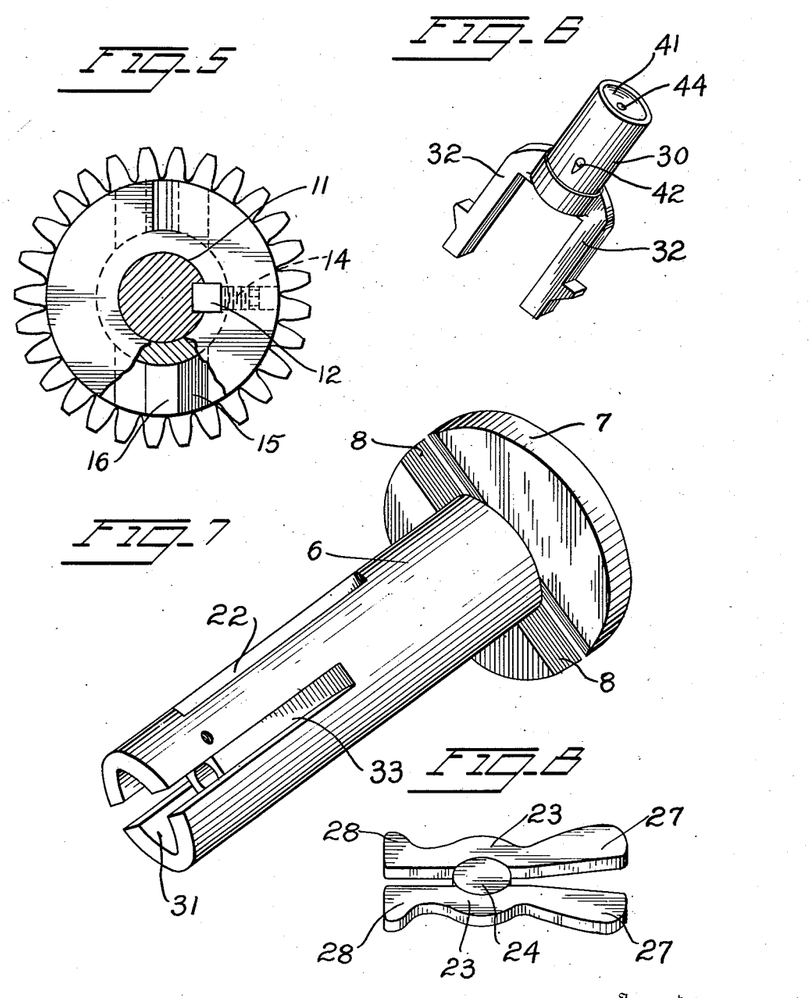
Figure 5 is a cross section taken on line 5—5 of Figure 1 broken away in part to show the structure of the engaging lugs.
Figure 6 is a perspective view of the reset plunger.
Figure 7 is a perspective view of the mandrel on which the release mechanism shown in Figure 1, is mounted.
Figure 8 is a perspective view of the triggers.

In the embodiment of my invention illustrated in Figures 1 and 2, there is provided a driving part, namely the gear wheel 1, and a driven part comprised by the mandrel 6, Figures 1, 2 and 7. The said mandrel 6, has formed integral therewith, and at the end thereof the laterally projecting annular collar 7, having the two bevel-sided or V shaped notches 8, formed at diametrically opposite positions along the inner edge of the said collar 7, and having the apex of the said notch 8, extending through to the bevel-sided notch 9, formed in the outer edge of the collar 7, thereby segmenting the collar 7, into two equal parts. The said mandrel 6, has a socket at one end to receive the end of a spindle or driven shaft 11. The said spindle 11, being splined, Figures 2 and 5 to the mandrel 6, by the key 12, held by the set screw 14.

Slidably mounted on the said mandrel 6, is the driving member or gear wheel 1, having formed integral, therewith and at diametrically opposite points, the two axially projecting V shaped lugs or bevel-sided dogs 15, having the ends 16, substantially squared, Figures 1 and 5.

The width of the said V shaped lugs 15 at the widest point or point nearest the driving member is greater than the greatest width of the V shaped or bevel sided notches 8, but the width of the said lugs or dogs 15 at the narrowest point or at the end 16 is less than the greatest width of the said notches 8. The bevel sides of the V shaped notches 8, and the V shaped dogs 15, are formed at an angle of substantially 45 degrees to the collar 7, Figure 1.

The bevel-sided or V shaped dogs 15, are adapted to engage in part, the bevel sides of the notches 8, and to thereby positively connect the driving member, gear wheel 1, and the driven member mandrel 6, in power-transmitting relationship.

Upon the driving and driven member being in engaging position the inner wall of the annular collar 7, and the wall of the gear wheel 1, are spaced apart, as shown in Figure 1, since the dogs 15, only in part engage the V shaped notches 8. The bevel sides of the V shaped notches 8, form a friction surface co-acting with the bevel sides of the V shaped dogs 15, to form sliding fits with the dogs 15, whereby upon an obstruction or an overload being applied to the spindle or to the driven member 6, the V shaped dogs 15, will slide along the bevel surface of the V shaped notches 8, up on and along the inner edge 17, of the collar 7, the squared end 16, of dogs 15, riding along the aforesaid edge 17, and the driving member gear wheel 1, moving longitudinally on the mandrel 6, placing the driving and driven members in disengaged positions.

Formed at the opposite end of the gear wheel 1, and integral therewith is the axially projecting flange 19, having provided the internal annular groove 20.

Acting against the longitudinal movement of the said gear wheel 1, is the expanding helical spring 21, coiled about the mandrel 6. The said mandrel 6, has apertured from opposite sides thereof, the longitudinal slot 22, adapted to receive the oppositely mounted locking or latching triggers or levers 23, positioned longitudinally therein, and fulcrumed on the roller 24, disposed within the slot 22, between the levers 23, and intermediate the ends of the said levers.

Slidably mounted on the said mandrel 6, are the collars 25 and 26. The collar 25, is positioned at the fore end of the aforesaid expansion spring 21, and contiguous with the flange 19, of the gear wheel 1, while at the opposite end of the said spring 21, is placed the collar 26. Adapted to engage the said collar 26, are the outwardly curved rear portions 27, of the levers 23. The levers 23 are pivotally mounted on the roller 24 in such a manner that when the said portions 27 project fully out of the said slot 22, the V shaped fingers 28 provided at the forward ends of the said levers 23 are positioned fully within the said slot 22. In the latter position the collar 25 is adapted to slide longitudinally on the mandrel 6 over the fingers 28 positioned within the slot 22 and thereby secure the said levers 23 within the slot 22. The curved portion 27, of the levers 23, engaging the collar 26, mounted at the rear end of the expansion spring 21, secures the collar 26, and the expansion spring 21, from moving longitudinally rearward, and thereby secures the expansion spring 21, in the compressed position.

With the spring 21, and the collar 26, thus held, the forward expansive force of the spring 21, normally maintains the dogs 15, in engaging position with the bevel sided notches 8. However, upon an obstruction or overload being applied to the driven shaft 11, the dogs 15 will disengage from the bevel sided notches 8, as previously explained. Moreover, the gear wheel 1 together with the collar 25 will slide longitudinally rearward on the said mandrel 6 so as to expose the annular groove 20 in the flange 19 for engagement with the fingers 28 of the levers 23. Further, the expansive force of the spring 21 will force the collar 26 against the outwardly curved rear portions 27 of the levers 23 and will thereby cause the said portions 27 to be projected inwardly into the slot 22, pivoting the levers 23 on the roller 24 and projecting the forward V shaped fingers 28 of the levers 23 outward from the slot 22 and into the groove 20. The said fingers 28 will thereby engage the said gear wheel 1 and lock the said gear wheel 1 in a disengaging position from the collar 7.

Moreover upon the collar 26 forcing the end portions 27 of the levers 23 into the slot 22, the said portions 27 will release the collar 26 and permit the said collar 26 to slide longitudinally rearward on the said mandrel 6 under the compression of the spring 21 and thereby release the said expansion spring 21.

Limiting the aforesaid longitudinal movement of the collar 26, under the expansive force of the spring 21, and functioning as an end thrust bearing for the levers 23, is the small metal bar 29, disposed across the rearward end of the slot 22, Figures 1 and 2. The said bar 29, having the opposite ends thereof, projecting laterally from opposite sides of the said mandrel 6, and the collar 26, thus limited by the projecting ends of the bar 29, is positioned immediately covering the end portions 27, of the levers 23, thereby locking the said portions 27, in the slot 22. In the latter position it will be readily apparent that the driving member gear wheel 1, will revolve on the mandrel 6, with the flange 19 turning on the fingers 28 positioned in the groove 20. Further the fingers 28 will thereby lock the dogs 15 of the said gear wheel 1 out of engaging relation with the bevel sided notches 8 of the collar 7, thus securing the mandrel 6 and the gear wheel 1 in a disengaging relation.

In order to reset the aforesaid, release clutch, there is provided a reset plunger 30, slidably received in the socket 31, formed at the end of the mandrel 6, Figures 1, 2, 4 and 7. The said reset plunger 30, has formed integral therewith, a pair of longitudinally extending parallel arms 32, which are slidably received in slots 33, formed in the mandrel 6, at right angles to the slot 22. The free ends of the arms 32, have laterally projecting lugs 34.

Upon depressing the reset plunger 30, the laterally projecting lugs 34, engage the collar 26, sliding the same longitudinally forward on the mandrel 6, thereby uncovering the end members 27, of the levers 23, mounted in slot 22, compressing the expansion spring 21, and upon the bevel-sided dogs 15, of the gear wheel 1, being adjusted opposite the bevel-sided notches 8, the expansive force of the spring 21, will force the said dogs 15, and notches 8, into engaging position.

The bevel-side 18, of the V shaped fingers 28, forms a sliding fit with the annular groove 20, whereby upon the ends 27, being uncovered by the longitudinal forward movement of the collar 26, the expansive force of the spring 21, will cause the flange 19, to slide along the bevel side 18, of the fingers 28, fulcruming the fingers 28, downward into the slot 22, disengaging the same from the annular groove 20. The levers 23, will be thereby fulcrumed on the roller 24, and the outwardly curved end members 27, projected out of the slot 22, in engaging position with the collar 26, the collar 25, sliding longitudinally forward covering the forward fingers 28, of the levers 23, as shown in Figure 2, thereby locking the levers 23, in the latter position.

A spring 35, is disposed in a socket 36, of the plunger 30, having its opposite end engaged in the socket 31, of the mandrel 6, which spring normally holds the reset plunger in the inoperative position. A cap 37, fits over the end of the mandrel 6, to hold the reset plunger in place, being adapted to engage the lugs 34, and thereby limiting the outward longitudinal movement of the said reset plunger 30. The said cap 37, is secured to the mandrel 6, by the set screw 38.

The metal housing 39, encloses the aforesaid mechanism, being screwed on the collar 25, as at 40, and at the end of the said housing 39, there is provided an opening to receive the head 41, of the reset plunger 30. Apertured at 44, in the head 41, of the said plunger 30, Figures 2 and 6, is the longitudinally extending passage 43, having the opening 42, formed at the opposite end thereof in the side of the plunger 30, Figures 1, 2, 4 and 6. The said passage 43, serving as a means for placing oil in the housing 39, for keeping the release mechanism enclosed thereby, properly oiled. It is readily apparent that in the normal position of the plunger 30, the opening 42, of the passage 43, is closed by the wall of the housing 39, but upon depressing the plunger 30, the opening 42, in the side of the plunger 30, is no longer closed and oil may be readily inserted through the passage 43, into the housing 39.

Figure 9:
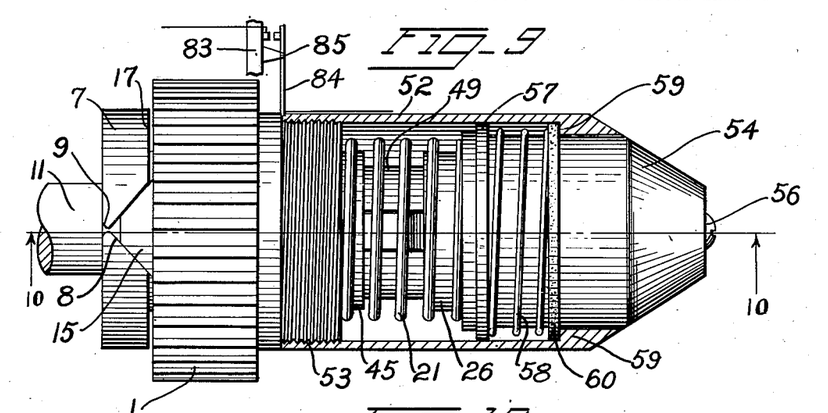
Figure 9 is a side elevation of a modified specie of my improved automatic release clutch, with the principal housing for convenience broken away showing the release mechanism.
Figure 10:
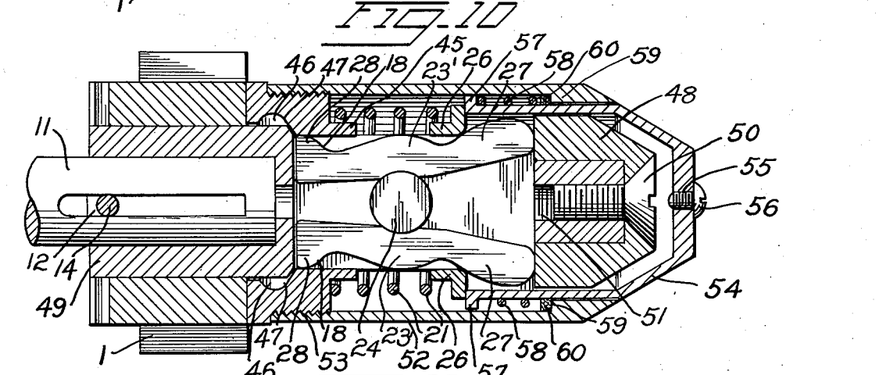
Figure 10 is a longitudinal section taken along the line 10—10 of Figure 9.
Figure 11:
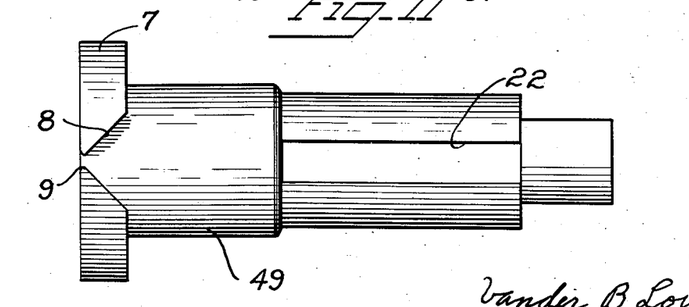
Figure 11 is a side elevation of the mandrel on which the release mechanism shown in Figure 10 is mounted.

The second specie of my invention illustrated by Drawings 9, 10 and 11, operates substantially the same as the form of my invention previously described. However, in the second form of my invention the gear wheel 1, is shown without the flange 19, previously described, formed integral therewith, and in place of the flange 19, having the groove 20, formed therein, there is provided the collar 45, having formed therein the internal annular groove 46, having the internal beveled edge 47. Thus, upon axial movement of the gear wheel 1, sliding the collar 45, longitudinally rearward and exposing the groove 46, to engagement with the fingers 28, of the levers 23', the said fingers 28, are projected out as previously described, from the slot 22, and lock in the annular groove 46, engaging the internal beveled edge 47. It is readily apparent that since the gear wheel 1, is not mechanically connected to the said collar 45, the groove 46, does not revolve with the gear wheel 1, on the projecting fingers 28, as in the case of the annular groove 19, shown in the first species of my invention.

A cap 48, fits over the end of the mandrel 49, being held in place by a screw threaded countersunk bolt 50, disposed in a screw threaded hole 51, located at the end of the mandrel 49, the said hole 51, extending inward to the end of the slot 22.

The metal housing 52, encloses the aforesaid mechanism, being screwed on the collar 45, as at 53, and the opposite end of the said housing 52, has an opening to receive an auxiliary housing 54. At the end of the said housing 54, there is provided a screw threaded hole 55, adapted for the insertion of oil into the housings 52 and 54. The said oil hole 55, may be readily closed by means of the screw threaded bolt 56.

Formed at the opposite end of the said housing 54, is a laterally projecting annular flange 57, formed integral with the said housing 54. An expanding helical spring 58 is coiled about the housing 54. The said spring 58 is engaged at one end by the flange 57 and at the opposite end by the annular felt washer 60 secured by the internal annular flange 59 formed integral with and at the end of the principal housing 52. The felt washer 60 is adapted to prevent the escape of the oil from the housing 52.

The expansive force of the spring 58, against the annular flange 57, of the auxiliary housing 54, causes the said housing 54 to be projected into the housing 52. The inward movement of the said housing 54 is limited by the laterally projecting annular flange provided on the collar 26. Thus, with the release clutch in coupled position, as shown by Figures 9 and 10, the spring 58, holds the auxiliary housing 54, firmly against the projecting flange provided on the collar 26, lessening thereby any noise or rattle in the housing 54. Further, upon the disengagement of the coupling means, the said spring 58, acts as a shock absorber against the expansive force of the spring 21, upon the disengagement of the collar 26, from the end members 27, of the levers 23'.

In resetting the release mechanism, it will be readily apparent, that while the expansive force of the spring 58, is less than that of the spring 21, since the expansive force of the spring 58, will be acting against the spring 21, it will be necessary to apply less manual force against the housing 54, to slide the collar 26, longitudinally forward, so as to compress the spring 21, to reset the release clutch. The expansive force of spring 21, thus acting against the collar 45, causes force to be in turn applied by the internal beveled edge 47, on the beveled surface 18, of the fingers 28, forming therewith a coacting friction surface, whereby the said fingers 28, are slid into the slot 22, the opposite ends 27, of the levers 23', being free to be fulcrumed out of the said slot 22, by the collar 26, having been previously moved longitudinally forward by the depressing of the auxiliary housing 54. Upon the disengagement of the fingers 28, the collar 45, under the expansive force of the spring 21, is projected longitudinally forward, together with the gear wheel 1, and the coupling means engaged as previously explained.

Figure 12:
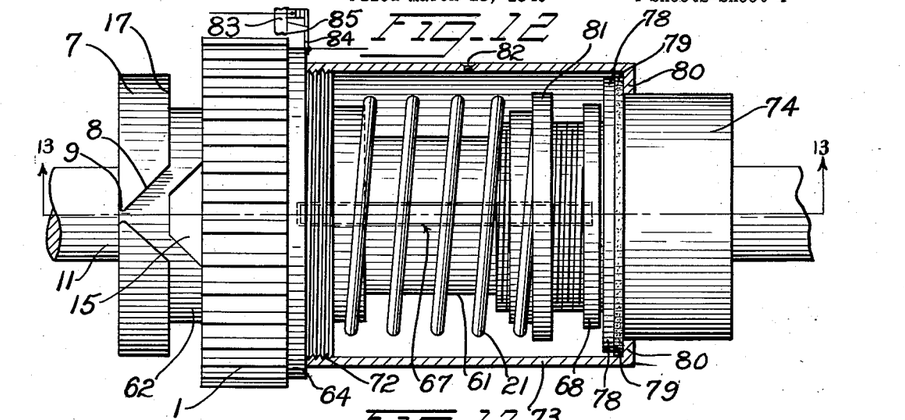
Figure 12 is a further modified specie of my improved automatic release clutch, with the principal housing for convenience broken away showing the release mechanism.
Figures 13, 14:
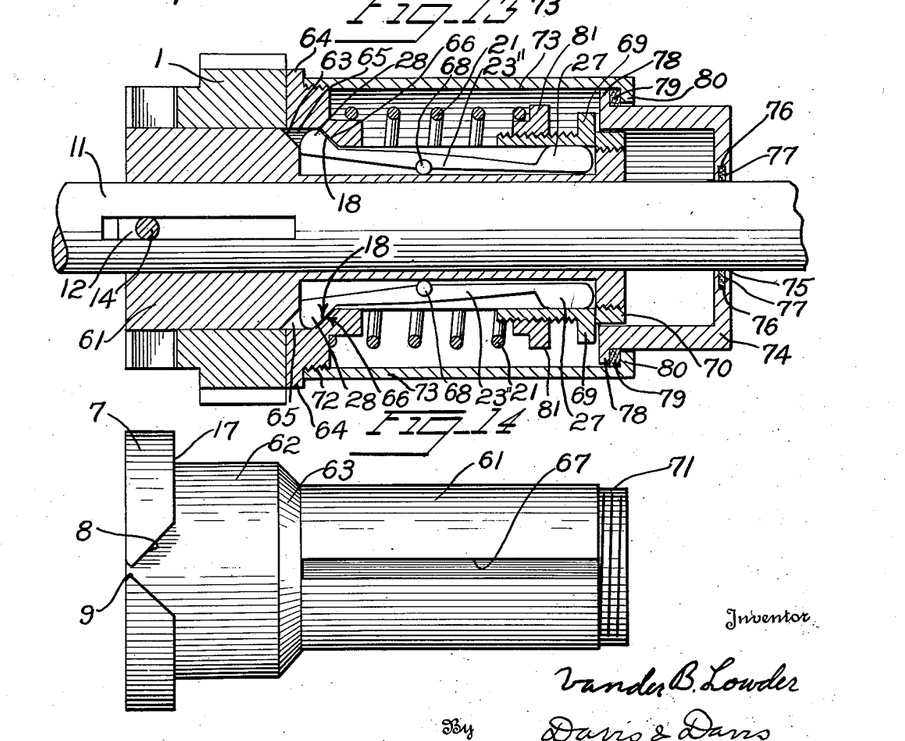
Figure 13 is a longitudinal section taken along the line 13—13 of Figure 12.
Figure 14 is a side elevation of the hub on which the release mechanism shown in Figure 12 is mounted.

A third specie of my invention is illustrated by Figures 12 and 13, which show the said release clutch in the disengaged position. The latter form of my invention provides a hub or mandrel 61, through which there is longitudinally extended a shaft or spindle 11. The said spindle 11 is splined to the hub 61, by the key 12, held by the set screw 14. Disposed adjacent one end of the said hub 61, is the collar 7, as previously described, and at the same end of the hub 61, there is provided an annular raised part 62, on which is slidably mounted the gear wheel 1, the aforesaid raised part 62, having an annular beveled side 63. Further, slidably mounted on the hub 61, and contiguous with the gear wheel 1, is the collar 64, having a socket 65, provided with an inner annular side 66. Upon the dogs 15, of the gear wheel 1, being coupled to the collar 7 of hub 61, by means of the notches 8, as previously explained, the annular raised part 62, is slidably received in the socket 65, of the collar 64, the beveled side 66, of the socket 65, being adapted to engage and fit contiguous with the beveled side 63, of the raised part 62. Upon the coupling means becoming disengaged as previously explained, the collar 64, is moved longitudinally rearward on the hub 61, by the axial movement of the gear wheel 1. Whereupon, the fingers 28 of the levers 23'', are exposed for engagement with the internal annular beveled side 66, of the collar 64. The expansive force of the spring 21, acting upon the collar 69, will cause the collar 69, to force the parts 27, of the levers 23'', into the slot 67, thereby fulcruming out of the slot 67, the fingers 28, which fingers 28, will engage the internal annular beveled side 66, of the collar 64. Further as the parts 27 of the levers 23'' are forced into the slot 22 the said collar 69 will slide longitudinally rearward over the parts 27 locking the parts 27 in the said slot 22 and the levers 23'' in the latter fulcrumed position as shown in Figure 13. A screw threaded cap 70 is screwed on the end of the hub 61 as at 71 in such a manner as to limit the rearward longitudinal movement of the collar 69 on the hub 61.

The aforementioned levers 23'', in the latter embodiment of my invention are fulcrumed on the separate rollers 68, mounted on either side of the hub 61, in the separate slots 67.

The metal housing 73, encloses the aforesaid mechanism, being screwed on the collar 64, as at 72. The said housing 73, has provided at the end thereof, an opening for receiving the auxiliary housing 74. At the end of the said auxiliary housing 74, there is similarly provided an opening 75, through which there is extended the shaft or spindle 11. A felt washer 76, disposed in the annular groove 77, is provided to prevent the loss of oil from the said housing 74.

At the opposite end of the said housing 74, and formed integral therewith is the laterally projecting annular flange 78, adapted to engage the annular felt washer 79, mounted on the said auxiliary housing 74, and the internal annular flange 80, formed integral with and at the end of the principal housing 73. The felt washer 79, likewise serves to prevent the escape of the lubricating oil from the said housing 73.

In resetting the release mechanism, the auxiliary housing 74, is depressed, causing the collar 69, to move longitudinally on the hub 61, exposing the portions 27, of the levers 23'', causing the spring 21, to be compressed and the fingers 28, to become disengaged from the internal bevel side 66, of collar 64, thus disengaging the collar 64, from the fingers 28, and re-engaging the dogs 15, with the notches 8, as previously explained.

Mounted on the collar 69, is the screw threaded adjustable collar 81, adapted to engage the screw threads on the collar 69. By means of the collar 81, the compression of the expansion spring 21, may be readily adjusted.

As shown in Figure 12, there is provided in the housing 73, a screw threaded hole closed by the bolt 82, which hole is adapted for the insertion of oil into the said housing.

While the form of my invention as shown in Figures 12 and 13 does not show the auxiliary spring 58, disclosed in the second form of my invention and illustrated by Drawings 9 and 10, the same is readily adaptable to the third form as well as the second.

Furthermore, a circuit controlling switch is associated with my automatic release clutch as shown in Figures 1, 9 and 12. Upon an overload or obstruction being applied to the driven member causing the gear wheel to move axially on the mandrel 6, 49 or hub 61, thereby disengaging the gear wheel 1, from the shaft or spindle 11, the circuit switch 83, is automatically closed sounding an alarm or breaking the circuit of the driving motor thus informing the operator of trouble rather than depending upon the operator to discover the trouble. In operation, the end of the actuating arm 84, rests against the laterally projecting annular flange formed on the forward collar of the release mechanism and indicated in Figure 1, by numeral 25, Figure 9, by numeral 45, and Figure 12, by numeral 64. One contact of the switch 83 is stationarily mounted while the opposite contact is mounted at the free end of the said actuating arm 84. Upon rearward axial movement of the said collar, the actuating arm 84, is pivoted at 85, by the axial movement of the laterally projecting annular flange aforesaid, closing the circuit as shown in Figure 12.

It will further appear that as the bevel sides of the dogs 15, and notches 8, are worn by friction, the spring 21, will force the dogs 15, further into the notches 18, thereby providing a convenient means for the taking up of slack in the coupling members and holding the coupling members firmly in the engaging position without loose play between the members. Further, since the co-acting friction surfaces of the bevel sided notches 8, and the bevel sided dogs 15, are of small area, the said coupling members may be disengaged with the minimum force. The force required to disengage the said coupling members is primarily dependent upon the expansive force of the spring 21, acting against the axial movement of the gear wheel 1.

Having thus described my invention, what I claim as my invention and desire to secure by Letters Patent is:

1. The combination comprising a mandrel having driving and driven members mounted thereon, releasable means for engaging the said members, an expansion spring mounted on the said mandrel, means for holding the said spring compressed to normally hold the said driving and driven members in engaging relationship, means for releasing the said expansion spring and for disengaging the said driving and driven members upon a predetermined overload on the driven member and means for compressing the said spring to return the driving member to a reengaging relationship with the driven member.

2. The combination comprising a mandrel having driving and driven members mounted thereon, releasable means for engaging the said members, an expansion spring mounted on the said mandrel, means for holding the said spring compressed to normally hold the said driving and driven members in engaging relationship, means for releasing the said expansion spring and for disengaging the said driving and driven members upon a predetermined overload on the driven member, including means for holding the said driving member disengaged from the driven member.

3. The combination comprising a mandrel having driving and driven members mounted thereon, releasable means for engaging the said members, an expansion spring mounted on the said mandrel, means for holding the said spring compressed to normally hold the said driving and driven members in engaging relationship, means for releasing the said expansion spring upon a predetermined overload on the driven member.

4. The combination comprising a mandrel having driving and driven members mounted thereon, releasable means for engaging the said members, a primary expansion spring mounted on the said mandrel to normally hold the driving and driven members in engaging relationship and an auxiliary spring mounted on the said mandrel acting in opposition to one end of the primary expansion spring.

5. The combination comprising a mandrel having driving and driven members mounted thereon, releasable means for engaging the said members, a primary expansion spring mounted on the said mandrel, means for holding the said spring compressed to normally hold the said driving and driven members in engaging relationship, means for releasing the said expansion spring upon a predetermined overload on the driven member and an auxiliary spring mounted on the said mandrel acting in opposition to one end of the primary expansion spring.

6. The combination comprising a mandrel having driving and driven members mounted thereon, releasable means for engaging the said members, a primary expansion spring mounted on the said mandrel, means for holding the said spring compressed to normally hold the said driving and driven members in engaging relationship, means for releasing the said expansion spring and for disengaging the said driving and driven members upon a predetermined overload on the driven member, mounted on the said mandrel an auxiliary spring acting in opposition to one end of the primary expansion spring and manually operable means for compressing the said primary expansion spring to return the driving member to a reengaging relationship with the driven member.

7. The combination comprising a mandrel having driving and driven members mounted thereon, releasable means for engaging the said members, a primary expansion spring mounted on the said mandrel, means for holding the said spring compressed to normally hold the said driving and driven members in engaging relationship, means for releasing the said expansion spring and for disengaging the said driving and driven members upon a predetermined overload on the driven member, including means for locking the said primary expansion spring in an inoperative position and an auxiliary spring acting in opposition to one end of the said primary expansion spring.

8. The combination comprising a work spindle, a mandrel connected to said spindle, a collar formed on said mandrel having a notch, a driving wheel slidably mounted on said mandrel having a lug for engaging said notch, an expansion spring for normally holding said notch and lug in engaging position, an internal annular groove formed in the said driving wheel, and the said mandrel having pivotally mounted levers adapted to engage the said internal annular groove upon axial movement of the said driving wheel disengaging the said driving wheel from the spindle.

9. The combination as set forth in claim 8, including manually operable means for releasing the said driving wheel from the engaging levers aforesaid and for returning the driving wheel to an engaging relationship with the said work spindle.

10. The combination comprising a mandrel having driving and driven members thereon, one of the members being adapted to rotate freely thereon, an expansion spring mounted on the said mandrel to normally hold the driving and driven members in engaging relationship, means for disengaging the said members upon a predetermined overload on the driven member, means for locking the said spring in an inoperative position, a principal housing enclosing the said locking means and an auxiliary housing slidably mounted at the end of the principal housing manually operable as a means to reengage the driving and driven members.

11. The combination comprising a mandrel having driving and driven members thereon, a primary expansion spring mounted on the said mandrel to normally hold the driving and driven members in engaging relationship, means for disengaging the said members upon a predetermined overload on the driven member, means for locking the primary expansion spring in an inoperative position, a principal housing enclosing the said locking means and an auxiliary housing slidably mounted at the end of the principal housing, a spring mounted on the said auxiliary housing acting in opposition to one end of the primary expansion spring and to the outward movement of the slidably mounted auxiliary housing, the latter housing serving as a manually operable means for the reengagement of the driving and driven members.

12. The combination comprising a work spindle, a mandrel connected to said spindle, a clutch collar carried by said mandrel, a driving wheel slidably mounted on said mandrel, means carried by said wheel for engagement with said clutch collar, an expansion spring mounted on said mandrel for normally holding said wheel and clutch collar in engaging position, levers pivotally mounted in a slot in said mandrel, the said levers having offsets at one end and V shaped fingers at the opposite ends, a collar slidable on said mandrel and movable by said spring to engage the offsets of said levers, whereby said levers are pivoted to engage the V shaped fingers in a groove in the said wheel when the wheel is disengaged from the clutch collar.

13. The combination comprising a work spindle, a mandrel connected to said work spindle, a driving wheel slidably mounted on said mandrel, the said driving wheel having a flange at one end provided with an internal annular groove, lugs projecting from the opposite end of the said wheel, a clutch collar carried by said mandrel, the said clutch collar having notches to receive said lugs, a pair of collars slidably mounted on said mandrel, an expansion spring mounted on said mandrel between said collars, a pair of levers pivotally mounted in a slot formed in said mandrel having offsets at one end and projecting V shaped fingers at the opposite ends, said fingers being adapted to engage in the bore of one of said collars when said spring is compressed and said lugs are engaged in said clutch collar, and said offsets being disposed in the path of movement of the other collar, whereby said levers are pivoted upon axial movement of said wheel to engage the fingers in the said internal annular groove of the flange of said driving wheel.

14. The combination comprising a hub having a spindle connected thereto axially projecting through a bore formed in the said hub, driving and driven members thereon, one of the members being adapted to rotate freely thereon, an expansion spring mounted on the said hub to normally hold the driving and driven members in engaging relationship, means for disengaging the said members upon a predetermined overload on the driven member, means for locking the said spring in an inoperative position, a principal housing enclosing the said locking means and an auxiliary housing slidably mounted on the spindle at the end of the principal housing manually operable as a means to reengage the driving and driven members.

15. The combination comprising a mandrel having driving and driven members mounted thereon, the said members comprising a clutch collar carried by said mandrel and a wheel slidably mounted on the said mandrel, V shaped bevel sided notches being formed in the said clutch collar adapted to engage in part V shaped bevel sided lugs having the ends thereof squared and projecting axially from the said wheel, the width of the said V shaped lugs being at the widest point greater than the greatest width of the V shaped bevel sided notches, and the width of the V shaped bevel sided lugs at the narrowest point being less than the greatest width of the V shaped bevel sided notches, an expansion spring mounted on said mandrel for normally holding the said lugs and notches in engaging position, the said lugs in engaging position separating the said clutch collar and wheel.

16. The combination comprising a hub having a spindle connected thereto axially projecting through a bore formed in the said hub, driving and driven members mounted on the said hub, the said members comprising a clutch collar carried by said hub and a wheel slidably mounted on the said hub, V shaped bevel sided notches being formed in the said clutch collar adapted to engage in part V shaped bevel sided lugs having the ends thereof squared and projecting axially from the said wheel, the width of the said V shaped lugs being at the widest point greater than the greatest width of the V shaped bevel sided notches and the width of the V shaped bevel sided lugs at the narrowest point being less than the greatest width of the V shaped bevel sided notches, an expansion spring mounted on said mandrel for normally holding the said lugs and notches in engaging position, the said lugs in engaging position separating the said clutch collar and wheel, and means for locking the said spring in an inoperative position upon a predetermined overload on the driven member.

17. The combination comprising a work spindle, a mandrel connected to said work spindle, a driving wheel slidably mounted on said mandrel, lugs projecting axially from the said wheel, a clutch collar carried by said mandrel having notches to receive said lugs, a pair of collars slidably mounted on said mandrel, an expansion spring mounted on said mandrel between the said collars for normally holding the said collars under spring tension and the said wheel and clutch collar in engaging relation, one of the said collars being positioned between the said expansion spring and the said driving wheel and the latter collar having an internal annular groove, a pair of levers pivotally mounted in a slot formed in the said mandrel, the said levers having offsets at one end and projecting V shaped fingers at the opposite ends, the said V shaped fingers being disposed within the collar positioned between the driving wheel and the said expansion spring, and the said offsets disposed in the path of movement of the other collar in such a manner as to engage the latter collar under the tension of the said spring, whereby upon axial movement of the said driving wheel the said levers are pivoted under the tension of the said spring in such a manner as to engage the fingers of the said levers in the said annular groove formed in the said collar mounted between the driving wheel and the said expansion spring.

18. An overload clutch comprising driving and driven members, releasable means for engaging the said members, an expansion spring operatively connected at one end to one of the said members in such a manner as to normally hold the said driving and driven members in engaging relationship, means provided at the other end of the said spring to hold the said expansion spring compressed, said means being released upon a predetermined overload on the driven member.

19. An overload clutch comprising driving and driven members, releasable means for engaging the said members, a mandrel having one of the said members slidably mounted thereon, an expansion spring operatively connected at one end to the said slidably mounted member and adapted to hold the said driving and driven members in engaging relationship, a locking means operatively connected to the other end of the said expansion spring, whereby upon axial movement of the said slidably mounted member the said spring is locked at the said one end against effecting clutch engagement.

20. An overload clutch comprising driving and driven members, releasable means for engaging the said members, a mandrel having one of the said members slidably mounted thereon, an expansion spring for normally holding the said driving and driven members in engaging relationship, a pivoted lever one end of which having means for engagement with the said expansion spring and the other end of said lever having means to engage the said slidably mounted member in such a manner as to lock the said driving and driven members in a disengaging relationship upon axial movement of the said slidably mounted member.

21. An overload clutch comprising driving and driven members, releasable means for engaging the said members, a mandrel having one of the said members slidably mounted thereon and the said member having a flange at one end provided with an internal annular groove, a lever pivotally mounted in a slot in said mandrel, the said lever having an offset at one end and a finger at the opposite end, a spring, a collar slidable on said mandrel and movable by said spring to engage the said offset of the said lever whereby said lever is pivoted to engage the said finger in the said groove in the flange aforesaid upon the disengagement of the said driving and driven members.

22. An overload clutch comprising driving and driven members, releasable means for engaging the said members, a mandrel having one of the said members slidably mounted thereon, resilient means for normally holding the said driving and driven members in engaging relationship, the said mandrel having a slot formed therein, a lever pivotally mounted in the said slot, the said lever having an offset at one end and a finger at the opposite end, a collar slidably mounted on the said mandrel and tension means for the said collar whereby the said collar is held in engaging relationship with the offset of the said lever, a second collar slidably mounted on the said mandrel and having an internal annular groove formed in such a manner that upon a predetermined overload on the said driven member the said lever is pivoted so that the finger aforesaid engages in the said internal annular groove locking in an inoperative position the resilient means for normally holding the said driving and driven members in engaging relation.

VANDER B. LOWDER.